United States Patent Office 2,979,479
Patented Apr. 11, 1961

2,979,479

SILICONE RUBBER OF IMPROVED TEAR STRENGTH

Frank J. Modic, Schenectady, N.Y., assignor to General Electric Company, a corporation of New York No Drawing. Filed July 15, 1957, Ser. No. 671,730

12 Claims. (Cl. 260—37)

This invention is concerned with organopolysiloxanes convertible by heat, and which in the cured, solid, elastic state have improved tear properties. More particularly the invention relates to a mixture of ingredients comprising (1) an organopolysiloxane convertible by heat to the cured, solid, elastic state, (2) a finely divided silica filler, (3) a curing agent for (1), and (4) a minor proportion of a methylpolysiloxane copolymer composed essentially of trimethylsiloxy groups [$(CH_3)_3SiO_{\frac{1}{2}}$] and $SiO_2$ groups, there being present from about 1.0 to 1.5 methyl groups per silicon atom in the aforesaid methylpolysiloxane copolymer.

Organopolysiloxanes convertible by heat to the solid, cured, elastic state (also known as "silicone rubbers") have found eminent use in applications requiring resistance to elevated temperatures of the order of from about 125–175° C. for extended periods of time. In order to improve the physical properties, for instance, tensile strength, elongation, and particularly the tear strength, of such polymeric materials, various reinforcing agents and fillers have been incorporated for this purpose. However, these fillers or reinforcing agents have not been able to improve to any desirable degree, the tear strength of the convertible organopolysiloxane to a point which approaches the tear strength of other synthetic and natural rubbers including, for instance, butadiene-styrene rubbers, butadiene-acrylonitrile rubbers, etc.

I have now discovered that I can obtain improved cured, solid, elastic organopolysiloxane having tear strengths superior to the tear strengths of unmodified cured organopolysiloxanes hereinbefore known by incorporating in such convertible organopolysiloxanes (in addition to the usual fillers) prior to heat curing or vulcanization thereof, a minor proportion, preferably less than 25%, by weight, based on the weight of the organopolysiloxane, of the aforesaid copolymer containing trimethylsiloxy and $SiO_2$ groups (said methyl polysiloxane hereinafter for brevity being referred to as "methylpolysiloxane" or "methylpolysiloxane copolymer").

The proportion of the methylpolysiloxane may be varied within wide limits without departing from the scope of the invention. Generally significant improvement in the tear strength of the cured product is obtained when as low as 1%, by weight, of the methylpolysiloxane copolymer is employed, based on the weight of the convertible methylpolysiloxane (that is exclusive of the filler, curing agent, or other modifying agents present therein). Generally, I prefer to employ from about 1 to 20%, by weight, of the methylpolysiloxane based on the weight of the convertible organopolysiloxane.

The convertible silicone compositions herein described, which may be highly viscous masses or gummy, elastic solids, depending on the state of condensation, the condensing agent employed, the starting organopolysiloxane used to make convertible organopolysiloxanes, etc., will hereinafter be referred to as "convertible organopolysiloxane" or more specifically as "convertible methylpolysiloxane" and "convertible methyl phenylpolysiloxane."

Although convertible organopolysiloxanes with which the present invention is concerned are well known, for purposes of showing persons skilled in the art the various convertible organopolysiloxanes which may be employed in the practice of the present invention, attention is directed to the convertible organopolysiloxanes disclosed and claimed in Agens Patent 2,448,756 and Sprung et al., Patent 2,448,556, both issued September 7, 1948; Sprung Patent 2,484,595, issued October 11, 1949; Krieble et al. Patent 2,457,688, issued December 28, 1948; Hyde Patent 2,490,357, issued December 6, 1949; Marsden Patent 2,521,528, issued September 5, 1950; and Warrick Patent 2,541,137, issued February 13, 1951.

It will of course be understood by those skilled in the art that other convertible organopolysiloxanes containing the same or different silicon-bonded organic, for instance, hydrocarbon substituents (e.g., methyl, ethyl, propyl, vinyl, allyl, phenyl, tolyl, xylyl, benzyl, phenylethyl, naphthyl, chlorophenyl, both methyl and phenyl, etc., radicals) connected to silicon atoms by carbon-silicon linkages, may be employed without departing from the scope of the invention.

The particular convertible organopolysiloxane used is not critical and may be any one of those described in the foregoing patents, which are generally obtained by condensation of a liquid organopolysiloxane containing an average of from about 1.95, preferably from about 1.98 to about 2.25 organic groups per silicon atom. The usual condensing agents which may be employed and which are well known in the art may include, for instance, ferric chloride hexahydrate, phenyl phosphoryl chloride, alkaline condensing agents, such as potassium hydroxide, sodium hydroxide, etc. These convertible organopolysiloxanes generally comprise polymeric diorganosiloxanes which may contain, for example, up to 2 mol percent copolymerized monoorganosiloxane, for example, copolymerized monomethylsiloxane. Generally, we prefer to use as the starting liquid organopolysiloxanes from which the convertible, for example, heat-convertible organopolysiloxane is prepared, one which contains about 1.999 to 2.01, inclusive, organic groups, for example, methyl groups per silicon atom, and where more than about 80 percent, preferably 90 percent, of the silicon atoms in the polysiloxane contain two silicon-bonded alkyl groups.

The starting organopolysiloxanes used to make convertible organosiloxanes by condensation thereof preferably comprise organic substituents consisting essentially of monovalent organic radicals attached to silicon through carbon-silicon linkages, there being on the average between 1.95 and 2.25 (e.g., 1.98 to 2.02) organic radicals per silicon atom, and in which the siloxane units consist of units of the structural formula $R_2SiO$, where R is preferably a radical of the group consisting of methyl and phenyl radicals. At least 90 percent of the total number of R groups are preferably methyl radicals. The polysiloxane may be one in which all of the siloxane units are $(CH_3)_2SiO$, or the siloxane may be a copolymer of dimethylsiloxane and a minor amount (e.g., from 1 to 20 or more mol percent) of any of the following units alone or in combination therewith:

$C_6H_5(CH_3)SiO$ and $(C_6H_5)_2SiO$

A small amount of cure accelerator, for instance, benzoyl peroxide, tertiary butyl perbenzoate, tertiary butyl peroxide, bis-(2,4-dichlorobenzoyl) peroxide, etc., may be incorporated into the convertible organopolysiloxane for the purpose of accelerating the cure, as is more particularly described in various patents mentioned above calling for the use of these materials as curing agents for silicone rubber.

The curing agents function to yield cured products hav-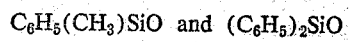

ing better properties, for instance, improved elasticity, tensile strength, and tear resistance, than is obtained by curing a similar gum composition or convertible organopolysiloxane free of any curing agent. The amount of curing agent which may be used may be varied widely, for example, from about 0.1 to about 8 percent or more, preferably from about 2 to 6 percent, by weight, based on the weight of the convertible organopolysiloxane.

The methylpolysiloxane copolymer is generally obtained by cohydrolyzing a mixture of ingredients comprising a trialkyl hydrolyzable silane and an alkyl silicate (either in a monomeric or polymeric state), said cohydrolysis product containing a plurality of silicon-bonded hydroxy groups.

The trialkyl hydrolyzable silane used in the preparation of the methylpolysiloxane is one which corresponds to the general formula $$R_3SiX$$

where R is a lower alkyl radical (e.g., methyl, ethyl, propyl, isopropyl, butyl, isobutyl, etc.), and X is a hydrolyzable group, for instance, halogen (e.g., chlorine, bromine, fluorine, etc.), alkoxy radical (e.g., methoxy, ethoxy, etc.), acyloxy, etc. It is essential that R be a lower alkyl radical since higher alkyl radicals undesirably slow down the hydrolysis of the $R_3SiX$ compound and cause a different type of intercondensation with the alkyl silicate, thus leading to less desirable products. Obviously, R may be the same, or different lower alkyl radicals.

The alkyl silicate employed for cohydrolysis with the trialkyl hydrolyzable silane is one which corresponds to the general formula $$(RO)_4Si$$

or a polyalkyl liquid silicate obtained by hydrolyzing the monomeric silicate to a stage where it is still liquid and preferably has a viscosity (for ease of handling) below about $0.5 \times 10^6$ centipoises. R in the above formula may be the same as that described for the trialkyl hydrolyzable silane and again obviously may be the same or different lower alkyl radicals disposed around the silicon atom.

Hydrolysis of the monomeric silictes to form the polymeric alkyl silicates containing a plurality of silicon-bonded hydroxy groups may be effected by incorporating in the monomeric silicate (for instance, monomeric ethyl orthosilicate) acidic materials which will effect hydrolysis, for instance, hydrochloric acid, sulfulic acid, phosphoric acid, etc. The incorporation of acid-forming metallic salts, for instance, ferric chloride, aluminum chloride, etc., may also be used for similar purposes. When employing the polymeric liquid alkyl polysilicate (for instance, polyethyl silicate), the hydrolysis is effected in such a manenr that in addition to there being present silicon-bonded alkoxy radicals (where the alkyl group is a lower alkyl radical), there will also be present a plurality of silicon-bonded hydroxyl groups. These silicon-bonded hydroxyl groups are required for interaction with the trialkyl hydrolyzable silane in the hydrolysis medium adhesive. The availability of silicon-bonded hydroxyl groups when working with a monomeric alkyl silicate is effected in the hydrolysis medium of the trialkyl hydrolyzable silane whereby the hydrogen halide acid liberated as a result of hydrolyzing a hydrolyzable silane containing a silicon-bonded halide, e.g., chlorine as the hydrolyzable group, and hydrogen chloride as the hydrohalide, will also effect condensation of the monomeric alkyl silicate to the desired hydroxy-containing polyalkyl silicate in one operation without requiring a preformed polyalkyl silicate. When cohydrolyzing an alkoxysilane with a monomeric alkyl silicate, it is necessary to add a small amount of an acid such as HCl, to effect hydrolysis and intercondenstion.

The cohydrolysis of the trialkyl hydrolyzable silane and the alkyl silicate (this designation for the silicate is intended hereinafter to include both the monomeric and polymeric forms of the alkyl silicate) is relatively simple and merely requires addition of the trialkyl hydrolyzable silane and the alkyl silicate to a suitable solvent, such as toluene, benzene, xylene, etc., and thereafter addition of the solution of the ingredients to a sufficient amount of water to effect the desired hydrolysis and co-condensation in a suitably acidic medium. The choice of the solvent will depend on such considerations as, for instance, the particular trialkyl hydrolyzable silane and alkyl silicate used, the relative proportions of the ingredients, the effect of the solvent on processing the hydrolysis and co-condensation product, etc. In this respect, water-miscible solvents such as alcohols, ketones, esters, etc., should be avoided since these materials do not effect adequate separation between the hydrolysis product and the water of hydrolysis so as to give satisfactory recovery of the reaction product of the trialkyl hydrolyzable silane and the alkyl silicate. The amount of solvent used may be varied widely but advantageously, by weight, it is within the range of from about 0.25 to 2 parts solvent per part of co-hydrolyzate, that is, the trialkyl hydrolyzable silane and the alkyl silicate.

The amount of water used for hydrolysis purposes is generally not critical and may be varied within wide ranges. The minimum amount of water required is that necessary to hydrolyze all the silicon-bonded hydrolyzable groups in the trialkyl hydrolyzable silane and all the alkoxy groups in the alkyl silicate. The maximum amount of water will generally be determined by the ease with which the co-hydrolyzate can be processed to isolate the co-hydrolysis product or methylpolysiloxane copolymer. If too much water is employed, the amount of acid present (either the hydrogen halide resulting when using trialkyl halogenosilanes or the acid, such as hydrochloric acid or sulfuric acid which must be added to effect cohydrolysis of non-acid-producing trialkyl hydrolyzable silanes, such as trialkyl alkoxysilanes) will be diluted to a point that the degree of condensation will be undesirably lowered and the de-alkoxylation of the alkyl silicate which is essential in the preparation of the resin will be undesirably reduced so that the necessary minimum level of silanol groups in the resin will not be obtained. Conversely, if one uses too little water for hydrolysis purposes, the concentration of the alkanol resulting from the co-hydrolysis reaction will be raised to such a high point that there will be insufficient phase separation, again making it difficult to separate the resin from the hydrolysis medium and undesirably reducing the yield of resin because of unavoidable losses resulting in increased solubility of the resin in the alcohol phase, making it difficult and impractical to attempt to recover this alcohol-soluble resin portion. The amount of water used should be at least from 2 to 3 mols water per total molar concentration of the trialkyl hydrolyzable silane and the alkyl silicate. In general, the amount of water used should be as low as possible to assist in good yields of the resin while utilizing to the fullest extent the space available in equipment used for hydrolysis purposes. An upper range of water which may be used with satisfactory results is that of the order of about 40 to 50 mols per mol of mixture of trialkyl hydrolyzable silane and alkyl silicate.

Advantageously, in making the methylpolysiloxane polymer, for each mol of the trialkyl hydrolyzable silane, one should use from 1 to 2 mols of the alkyl silicate, preferably within the range of from about 1.4 to 1.9 mols of the alkyl silicate per mol of trialkyl hydrolyzable silane. In the preparation of the resin, one may add small amounts, for instance, up to 5 percent, by weight, based on the weight of the trialkyl hydrolyzable silane of other co-hydrolyzable materials, such as dimethyidichlorosilane, phenyltrichlorosilane, methyltrichlorosilane, etc. Amounts in excess of this should be avoided because it will deleteriously harm the improvements induced by the use of the methylpolysiloxane co-polymer. However, satisfactory results are realized without these additional ingredients and preferably for control purposes these small amounts of added hydrolyzable organosilanes are omitted.

In preparing the methylpolysiloxane copolymer, the trialkyl hydrolyzable silane and alkyl silicate are dissolved in a suitable solvent, and added with stirring to the water of hydrolysis, advantageously using temperatures of from 60 to 85° C. Thereafter, the two-phase system thus obtained is processed to remove the water-alcohol layer and the remaining resinous material is neutralized with a sufficient amount of sodium bicarbonate or other alkaline material to give a pH of at least about 6 or 7. Thereafter the resin is filtered and advantageously adjusted to a resinous solids content of about 30 to 65 percent, using, where desired, additional amounts of solvents such as toluene, xylene, etc.

It is only necessary to mechanically mix the methylpolysiloxane copolymer with the convertible organopolysiloxane in the desired proportions, incorporate fillers (for instance, silica aerogel, fume silica, precipitated silica, finely divided diatomaceous earth, etc.) in the mixture of ingredients together with any one of the known curing or vulcanizing agents for the convertible organopolysiloxane, and heat the mixture of ingredients at temperatures ranging from 125 to 200° C. If molding is required, molding pressures of the order of from about 500 to 1000 p.s.i. or more for times of the order of from about 5 to 30 minutes or more, depending on the application involved, may be employed. It will be found that the tear resistance after this initial molding cycle will be greatly improved as a result of the incorporation of the methylpolysiloxane copolymer. It may be desirable in many instances, in order to bring out the optimum properties of the molded product, to subject the latter to further heat treatment usually outside the mold at more elevated temperatures of the order of about 150° to 300° C. for from 1 to 24 hours or more.

In order that those skilled in the art may better understand how the present invention may be practiced, the following examples are given by way of illustration and not by way of limitation. All parts are by weight.

EXAMPLE 1

A highly viscous convertible methylpolysiloxane was prepared by condensing octamethylcyclotetrasiloxane at a temperature of about 145° C. for approximately four hours with about 0.01%, by weight, thereof potassium hydroxide. This polymer, which was soluble in benzene and had a slight flow at room temperature, will hereinafter be referred to as "convertible methylpolysiloxane."

EXAMPLE 2

In this example, 108 parts trimethylchlorosilane, 374 parts ethylorthosilicate, and 250 parts toluene were charged to a reactor and 144 parts water were added at such a rate that the temperature during the addition of water (employing stirring throughout this period) was maintained at about 75 to 80° C., substantially autogenous temperature. After complete hydrolysis and intercondensation of the reactants have taken place, the acid aqueous layer was removed and the residual methylpolysiloxane copolymer was treated with a sufficient amount of sodium bicarbonate to neutralize essentially all the residual hydrochloric acid present. Thereafter the methylpolysiloxane copolymer was filtered.

EXAMPLE 3

74 parts of the convertible methylpolysiloxane was mixed with 26 parts Santocel (finely divided silica aerogel manufactured by Monsanto Chemical Company) and 1.65 parts benzoyl peroxide. Varying amounts of the methylpolysiloxane copolymer described in Example 2 were added to this basic formulation of the convertible methylpolysiloxane, and the various mixtures of ingredients heated in mold at a temperature of about 150° C. for about 15 minutes under a pressure of about 500 p.s.i. Thereafter, the samples were heated an additional one hour at 150° C. The tear strength of the samples was then determined both after initial heating at 150° C. for 15 minutes and after the one hour heat treatment outside the mold at 150° C. The following Table I shows the amounts of the methylpolysiloxane copolymer present in the cured convertible organopolysiloxane rubber formulations, and the tear strengths of the various samples after the above heat treatments.

Table I

| Sample No. | Parts Methyl Polysiloxane Copolymer [1] | Tear Strength in lbs./inch | |
|---|---|---|---|
|  |  | After Press Cure | After 1 Hour at 150° C. |
| 1 | [2] None | 66 | 68 |
| 2 | 2.5 | 74 | 74 |
| 3 | 5 | 82 | 94 |
| 4 | 10 | 85 | 84 |

[1] Per 100 parts of the mixture of the convertible methylpolysiloxane silica filler, and benzoyl peroxide.
[2] Control.

EXAMPLE 4

In this example 200 parts of the mixture of the convertible methylpolysiloxane, silica aerogel, and benzoyl peroxide in the proportions recited in Example 3 were homogeneously combined with varying amounts of the methylpolysiloxane copolymer described in Example 2. A control formulation was also prepared in which the methylpolysiloxane copolymer was omitted but otherwise the ingredients as well as proportions of ingredients, were the same. Each formulation was molded at a temperature of about 150° C. for 15 minutes under a pressure of 500 p.s.i., and thereafter the samples were heated for 1 hour at 150° C. and also for 11 hours at 250° C. The tensile strength, percent elongation, and tear strength of each of the samples after the 1 hour heat aging and the 11 hour heat aging were determined. The formulations employed in this example are described in Table II while the properties of the cured samples are described in Table III.

Table II

| Sample No. | Parts of Rubber Formulation [1] | Methylpolysiloxane Copolymer |
|---|---|---|
| 5 | 200 |  |
| 6 | 200 | 5 |
| 7 | 200 | 20 |

[1] Composed of convertible methylpolysiloxanes, silica aerogel, and benzoyl peroxide.

Table III

| Sample No. |  | 1 hr./150° C. | 11 hrs./250° C. |
|---|---|---|---|
| 5 | Tensile, p.s.i. | 841 | 699 |
|  | Percent elongation | 280 | 280 |
|  | Tear strength, lbs./inch | 66 | 58 |
| 6 | Tensile, p.s.i. | 914 | 775 |
|  | Percent elongation | 320 | 265 |
|  | Tear strength, lbs./inch | 60 | 66 |
| 7 | Tensile, p.s.i. | 875 | 738 |
|  | Percent elongation | 410 | 290 |
|  | Tear strength, lbs./inch | 73 | 92 |

EXAMPLE 5

In this example, a convertible methyl phenylpolysiloxane was prepared by interacting in the manner described in Example 1, a mixture comprising, by weight, 100 parts octamethylcyclotetrasiloxane and 15 parts octaphenylcyclotetrasiloxane employing a small amount of potassium hydroxide as the condensation catalyst. The methyl phenylpolysiloxane thus obtained was treated to neutralize the KOH and to remove essentially all volatiles boiling below 250° C. when measured at 760 mm. This devolatized methyl phenylpolysiloxane gum was mixed with 45 parts of a fume silica and 1.5 parts benzoyl peroxide (in the form of a 50 weight percent methylpolysiloxane fluid dispersion). Additional formulations were prepared from this mixture of ingredients by incorporating varying amounts of the methylpolysiloxane copolymer described in Example 2. Each of the formulations was then molded as was done in Example 3 and thereafter heat-aged for one hour at 150° C. and also for one hour at 250° C. The tensile strength, percent elongation, and tear strength of the heat-aged samples after the one hour at 150° C. and after one hour at 250° C. were determined. The following Table IV shows the formulations employed in each instance while Table V shows the results of the heat-aging as far as physical properties of the cured samples are concerned.

Table IV

| Sample No. | Parts Methyl Phenylpolysiloxane | Parts Fume Silica | Parts Benzoyl Peroxide | Parts Methylpolysiloxane Copolymer |
|---|---|---|---|---|
| 8 | 100 | 45 | 1.5 | |
| 9 | 100 | 45 | 1.5 | 2.5 |
| 10 | 100 | 45 | 1.5 | 5 |
| 11 | 100 | 45 | 1.5 | 10 |

Table V

| Sample No. | | 1 hr./150° C. | 1 hr./250° C. |
|---|---|---|---|
| 8 | Tensile, p.s.i. | 823 | 508 |
|   | Percent elongation | 220 | 130 |
|   | Tear strength, lbs./inch | 85 | 51 |
| 9 | Tensile, p.s.i. | 1,058 | 681 |
|   | Percent elongation | 310 | 200 |
|   | Tear strength, lbs./inch | 97 | 62 |
| 10 | Tensile, p.s.i. | 938 | 599 |
|    | Percent elongation | 320 | 215 |
|    | Tear strength, lbs./inch | 107 | 64 |
| 11 | Tensile, p.s.i. | 1,140 | 820 |
|    | Percent elongation | 386 | 270 |
|    | Tear strength, lbs./inch | 103 | 71 |

As pointed out above, it is important for optimum results that the methylpolysiloxane copolymer employed in combination with the convertible organopolysiloxane be substantially free of difunctional (for instance, dimethylsiloxy) units or trifunctional (for instance, monomethylsiloxy) units. The following example illustrates the importance of employing a methylpolysiloxane copolymer of the type described in the instant application.

EXAMPLE 6

The convertible methylpolysiloxane obtained pursuant to Example 1 was treated so as to neutralize the potassium hydroxide present therein and thereafter essentially all volatiles boiling below 250° C. at 760 mm. were removed. A moldable formulation (identified as Sample No. 12) was prepared from 300 parts of this devolatized gum, about 20 parts of the methylpolysiloxane copolymer described in Example 2, 120 parts silica aerogel, and 4.5 parts benzoyl peroxide in the form of 50% weight dispersion in a methylpolysiloxane fluid. Another formulation (identified as Sample No. 13) was prepared similarly as Sample No. 12 with the exception that the methylpolysiloxane copolymer was replaced by about 20 parts of a methyl phenylpolysiloxane resin obtained by cohydrolyzing on a weight basis, about 15.6 parts methyltrichlorosilane, 13.6 parts dimethyldichlorosilane, 44.4 parts phenyltrichlorosilane, and 26.4 parts diphenyldichlorosilane. A control formulation (identified as Sample No. 14) was prepared similarly as Sample No. 12 with the exception that the methylpolysiloxane copolymer was not added to the formulation. Each sample was molded similarly as was done in Example No. 5. The molded samples were then heated for one hour at 150° C. and thereafter for 24 hours at 250° C. Tensile strength, elongation and tear strength of each of the molded, cured formulations was determined similarly as was done in the preceding examples, the results of these physical tests being found described in Table VI.

Table VI

| Sample No. | | Immediately After Molding | 1 hr./150° C. | 24 hrs./250° C. |
|---|---|---|---|---|
| 12 | Tensile, p.s.i. | 1,144 | 912 | 583 |
|    | Percent elongation | 780 | 480 | 410 |
|    | Tear strength, lbs./inch | 137 | 99 | 101 |
| 13 | Tensile, p.s.i. | 600 | 518 | 520 |
|    | Percent elongation | 380 | 280 | 270 |
|    | Tear strength, lbs./inch | 103 | 99 | 74 |
| 14 | Tensile, p.s.i. | 421 | 455 | 474 |
|    | Percent elongation | 250 | 200 | 230 |
|    | Tear strength, lbs./inch | 80 | 82 | 85 |

As will be noted in the foregoing example, the convertible organopolysiloxane containing the methylpolysiloxane copolymer was markedly superior in all physical properties, including tear strength, to both the control as well as the sample modified with the resinous composition. It will also be noted that the sample containing the methylpolysiloxane copolymer maintained its tear strength even after 24 hours at 250° C., while the sample containing the resin lost its tear strength after heat-aging so that in this respect it was inferior even to the control.

Generally, no particular advantage is derived from incorporating more than about 15% of the methylpolysiloxane copolymer in the convertible organopolysiloxane and as will be evident from the above table, excessive amounts may cause some reduction of tear strength after a certain point, particularly if the cured product is heat-aged at elevated temperatures for additional times in addition to that at which the samples were molded.

It will, of course, be apparent to those skilled in the art that other fillers may be employed, as well as other curing agents and organopolysiloxanes in addition to those described in the above-identified examples. The amount of curing agent which is used may obviously be varied widely but generally it has been found to be advantageously in the range of from about 0.1 to about 8%, preferably from about 2 to 6%, by weight, based on the weight of the convertible organopolysiloxane.

The amount of filler used may also be varied within wide limits and may range, for instance, from about 10 to 300% of the weight of the convertible organopolysiloxane. The actual amount of filler used will depend upon such factors as the type of filler, the convertible organopolysiloxane, the application for which the cured product is intended, the proportion of the methylpolysiloxane copolymer, etc. A range which is advantageously employed on a weight basis is from 0.2 to 3 parts of filler per part of convertible organopolysiloxane.

Obviously, other convertible organopolysiloxanes, in addition to the convertible methylpolysiloxane described in the foregoing examples may be employed in combination with minor proportions of the methylpolysiloxane copolymer. Many examples of these convertible organopolysiloxanes, which preferably comprise convertible hydrocarbon-substituted polysiloxane in which the hydrocarbon radicals (e.g., alkyl, aryl, alkaryl, aralkyl, alkenyl, etc., radicals) are attached to silicon by carbon-silicon linkages, have been described previously and find additional basis in the patents recited above. The presence of copolymerized monocyclic arylsiloxanes, for example, copolymerized diphenylsiloxane or copolymerized methyl phenylsiloxane, in addition to the polydialkylsiloxane, for instance, polydimethylsiloxane, imparts improved low temperature flexibility to the cured silicone rubber products.

The cured, solid, elastic organopolysiloxanes prepared in accordance with the present invention are capable of withstanding elevated temperatures (150° C. to 250° C.) for extended periods of time without undesirable reduction in the properties of the cured products. The same materials also retain their desirable rubbery properties at temperatures as low as −60° C. The high temperature resistance and especially the improved tear strength of these materials make them admirably suitable as insulation materials for electrical conductors, as gasket materials (for instance, in jet airplane applications, etc.), shock absorbers, and for various applications where other natural or synthetic rubbers have heretofore been employed where it is desired to take advantage of the high temperature resistance and the low temperature flexibility of the claimed organopolysiloxanes.

The compositions herein described are useful as valve seats, for instance, in connection with hot water or other heated liquid safety valves, because of their outstanding temperature resistance and freedom from sticking after long periods of use at the elevated temperatures, as well as because of their increased tensile strength and tear resistance.

Among the unexpected advantages of employing the methylpolysiloxane copolymer herein described with convertible organopolysiloxanes is the improvement obtained in the "green" strength of a filled, uncured silicone rubber. Thus, in the extrusion of silicone rubber tubing, the filled silicone rubber compound containing the curing agent, as well as other modifying ingredients required to give the desired product, is generally extruded at room temperature and it is necessary that the extruded configuration be maintained from the time of extrusion to the time it is led into a heating chamber for the ultimate vulcanization. The ability of the extruded compound to maintain its shape is determined by the green strength of the molding composition. If the green strength is low, the tubing will collapse and obviously when ultimately vulcanized will not give the desired finally cured configuration. The presence of the methylpolysiloxane copolymer enables the extruded composition to maintain its shape under varied conditions of handling until the heat vulcanization has set the extruded composition to its final form.

What I claim as new and desire to secure by Letters Patent of the United States is:

1. A composition of matter comprising (1) an organopolysiloxane convertible by heat to the cured, solid, elastic state, there being present in said organopolysiloxane from 1.95 to 2.25 silicon-bonded organo groups selected from the class consisting of monovalent hydrocarbon radicals and chlorinated phenyl radicals per silicon atom, (2) from 10 to 300% by weight, based on the weight of (1), of a finely divided silica filler and (3) from 1 to 20 percent, by weight, based on the weight of (1) of a methylpolysiloxane copolymer composed essentially of trimethylsiloxy groups and $SiO_2$ groups, there being present from 1.0 to 1.5 methyl groups per silicon atom in the aforesaid methylpolysiloxane copolymer.

2. A composition of matter comprising (1) an organopolysiloxane convertible by heat to the cured, solid, elastic state, there being present in said organopolysiloxane from 1.95 to 2.25 silicon-bonded organo groups selected from the class consisting of monovalent hydrocarbon radicals and chlorinated phenyl radicals per silicon atom, (2) from 10 to 300% by weight, based on the weight of (1), of a finely divided silica filler, (3) from 1 to 20 percent, by weight, based on the weight of (1) of a methylpolysiloxane copolymer composed essentially of trimethylsiloxy groups and $SiO_2$ groups, there being present from 1.0 to 1.5 methyl groups per silicon atom in the aforesaid methylpolysiloxane copolymer, and (4) a curing agent for (1).

3. A composition of matter as in claim 1 in which the convertible organopolysiloxane is a convertible methylpolysiloxane.

4. A composition of matter as in claim 1 in which the convertible organopolysiloxane is a methyl vinylpolysiloxane.

5. A composition of matter as in claim 1 in which the convertible organopolysiloxane is a methyl phenylpolysiloxane.

6. A composition of matter comprising a methyl vinylpolysiloxane convertible by heat to the cured, solid, elastic state and containing from 1.95 to 2.25 silicon-bonded methyl and vinyl radicals per silicon atom (2) from 10 to 300% by weight, based on the weight of (1), of a finely divided silica filler, (3) from 1 to 20 percent, by weight, based on the weight of (1) of a methylpolysiloxane copolymer composed essentially of trimethylsiloxy groups and $SiO_2$ groups, there being present from 1.0 to 1.5 methyl groups per silicon atom in the aforesaid methylpolysiloxane copolymer, and (4) a peroxy curing agent for (1).

7. A composition of matter of improved tear strength comprising the heat-treated product of claim 1.

8. A composition of matter of improved tear strength comprising the heat-treated product of claim 2.

9. A composition of matter of improved tear strength comprising the heat-treated product of a mixture of ingredients comprising (1) a methylpolysiloxane convertible by heat to the cured, solid, elastic state and containing from 1.95 to 2.25 silicon-bonded methyl radicals per silicon atom, (2) from 10 to 300% by weight, based on the weight of (1), of a finely divided silica filler, (3) from 1 to 20 percent, by weight, based on the weight of (1) of a methylpolysiloxane copolymer composed essentially of trimethylsiloxy groups and $SiO_2$ groups, there being present from about 1.0 to 1.5 methyl groups per silicon atom in the aforesaid methylpolysiloxane copolymer and (4) a peroxy curing agent.

10. A composition of matter of improved tear strength comprising the heat-treated product of a mixture of ingredients comprising (1) a methyl vinylpolysiloxane convertible by heat to the cured, solid, elastic state and containing from 1.95 to 2.25 silicon-bonded methyl and vinyl radicals per silicon atom, (2) from 10 to 300% by weight, based on the weight of (1), of a finely divided silica filler, (3) from 1 to 20 percent, by weight, based on the weight of (1) of a methylpolysiloxane copolymer composed essentially of trimethylsiloxy groups and $SiO_2$ groups, there being present from about 1.0 to 1.5 methyl groups per silicon atom in the aforesaid methylpolysiloxane copolymer and (4) a peroxy curing agent.

11. A composition of matter of improved tear strength comprising the heat-treated product of a mixture of ingredients comprising (1) a methyl phenylpolysiloxane convertible by heat to the cured, solid, elastic state and containing from 1.95 to 2.25 silicon-bonded methyl and phenyl radicals per silicon atom, (2) from 10 to 300% by weight, based on the weight of (1), of a finely divided silica filler, (3) from 1 to 20 percent, by weight, based on the weight of (1) of a methyl phenylpolysiloxane copolymer composed essentially of trimethylsiloxy groups and $SiO_2$ groups, there being present from about 1.0 to 1.5 methyl groups per silicon atom in the aforesaid methylpolysiloxane copolymer and (4) a peroxy curing agent.

12. The process for improving the green strength of a silica-filled solid, elastic organopolysiloxane which comprises incorporating in an organopolysiloxane convertible by heat to the cured, solid, elastic state from 1 to 20 percent, by weight, based on the weight of the latter, of a methylpolysiloxane copolymer composed essentially of trimethylsiloxy groups and $SiO_2$ groups, there being present from about 1.0 to 1.5 methyl groups per silicon atom in the aforesaid methylpolysiloxane copolymer, the silica filler being present in an amount equal to from 10 to 300 percent by weight, based on the weight of the convertible organopolysiloxane, there being present in said convertible organopolysiloxane from 1.95 to 2.25 silicon-bonded organo groups selected from the class consisting of monovalent hydrocarbon radicals and chlorinated phenyl radicals per silicon atom.

References Cited in the file of this patent

UNITED STATES PATENTS

| | | |
|---|---|---|
| 2,442,196 | Coggeshall | May 25, 1948 |
| 2,601,337 | Smith-Johannsen | June 24, 1952 |
| 2,814,601 | Currie et al. | Nov. 26, 1957 |
| 2,819,236 | Dickmann | Jan. 7, 1958 |
| 2,838,472 | Lucas | June 10, 1958 |
| 2,857,356 | Goodwin | Oct. 21, 1958 |

FOREIGN PATENTS

| | | |
|---|---|---|
| 740,573 | Great Britain | Nov. 16, 1955 |